United States Patent
Bosch et al.

(10) Patent No.: US 10,063,468 B2
(45) Date of Patent: Aug. 28, 2018

(54) LEAKING ROUTES IN A SERVICE CHAIN

(71) Applicant: CISCO TECHNOLOGY, INC., San Jose, CA (US)

(72) Inventors: Hendrikus G. P. Bosch, Aalsmeer (NL); Sape Jurriën Mullender, Amsterdam (NL); Jeffrey Napper, Delft (NL); Surendra M. Kumar, San Ramon, CA (US); Alessandro Duminuco, Milan (IT)

(73) Assignee: Cisco Technology, Inc., San Jose, CA (US)

( * ) Notice: Subject to any disclaimer, the term of this patent is extended or adjusted under 35 U.S.C. 154(b) by 271 days.

(21) Appl. No.: 14/997,212

(22) Filed: Jan. 15, 2016

(65) Prior Publication Data

US 2017/0208000 A1    Jul. 20, 2017

(51) Int. Cl.
*H04L 12/50* (2006.01)
*H04L 12/721* (2013.01)
*H04L 12/741* (2013.01)

(52) U.S. Cl.
CPC ............ *H04L 45/38* (2013.01); *H04L 45/745* (2013.01)

(58) Field of Classification Search
CPC ........................................................ H04L 45/38
USPC .......................................................... 370/392
See application file for complete search history.

(56) References Cited

U.S. PATENT DOCUMENTS

| | | | |
|---|---|---|---|
| 4,769,811 A | 9/1988 | Eckberg et al. | |
| 7,644,182 B2 | 1/2010 | Banerjee | |
| 7,738,469 B1 | 6/2010 | Shekokar et al. | |
| 7,814,284 B1 | 10/2010 | Glass et al. | |
| 8,094,575 B1 | 1/2012 | Vadlakonda | |
| 9,300,585 B2 | 3/2016 | Kumar et al. | |
| 9,407,540 B2 | 8/2016 | Kumar et al. | |
| 9,491,094 B2 | 11/2016 | Patwardhan et al. | |
| 9,559,970 B2 | 1/2017 | Kumar et al. | |
| 9,608,896 B2 * | 3/2017 | Kumar | H04L 41/12 |
| 2004/0109412 A1 | 6/2004 | Hansson | |
| 2005/0204042 A1 | 9/2005 | Banerjee | |
| 2005/0289244 A1 | 12/2005 | Sahu et al. | |
| 2008/0177896 A1 | 7/2008 | Quinn et al. | |
| 2008/0181118 A1 | 7/2008 | Sharma | |
| 2008/0209039 A1 | 8/2008 | Tracey et al. | |
| 2009/0003364 A1 | 1/2009 | Fendick et al. | |
| 2011/0023090 A1 | 1/2011 | Asati et al. | |

(Continued)

FOREIGN PATENT DOCUMENTS

WO    WO2015/073190    5/2015

OTHER PUBLICATIONS

USPTO Mar. 7, 2016 Final Office Action from U.S. Appl. No. 14/037,143.

(Continued)

*Primary Examiner* — Dang Ton
(74) *Attorney, Agent, or Firm* — Patterson + Sheridan, LLP (57) ABSTRACT

Particular embodiments described herein provide for a communication system that can be configured for receiving, at a network element, a flow offload decision for a first service node. The flow offload decision can include a portion of a service chain for processing a flow and updating next hop flow based routing information for the flow. A next hop in the flow can insert flow specific route information in its routing tables to bypass a packet forwarder serving the service that offloaded the flow in the reverse direction.

20 Claims, 4 Drawing Sheets

(56) References Cited

U.S. PATENT DOCUMENTS

| | | |
|---|---|---|
| 2011/0255538 A1 | 10/2011 | Srinivasan |
| 2012/0131662 A1 | 5/2012 | Kuik |
| 2013/0003735 A1 | 1/2013 | Chao et al. |
| 2013/0044636 A1 | 2/2013 | Koponen |
| 2013/0124708 A1 | 5/2013 | Lee |
| 2013/0163594 A1 | 6/2013 | Sharma |
| 2013/0163606 A1 | 6/2013 | Bagepalli et al. |
| 2013/0272305 A1 | 10/2013 | Lefebvre et al. |
| 2013/0311675 A1 | 11/2013 | Kancherla |
| 2014/0036730 A1 | 2/2014 | Nellikar |
| 2014/0115062 A1 | 4/2014 | McDysan |
| 2014/0254603 A1 | 9/2014 | Banavalikar |
| 2014/0279863 A1 | 9/2014 | Krishnamurthy |
| 2014/0280836 A1 | 9/2014 | Kumar et al. |
| 2014/0321459 A1 | 10/2014 | Kumar et al. |
| 2015/0012988 A1 | 1/2015 | Jeng et al. |
| 2015/0052516 A1 | 2/2015 | French |
| 2015/0071285 A1 | 3/2015 | Kumar et al. |
| 2015/0074276 A1 | 3/2015 | DeCusatis |
| 2015/0085870 A1 | 3/2015 | Narasimha et al. |
| 2015/0089082 A1 | 3/2015 | Patwardhan et al. |
| 2015/0138973 A1* | 5/2015 | Kumar ............ H04L 45/12 370/235 |
| 2015/0222516 A1 | 8/2015 | Deval |
| 2015/0222533 A1* | 8/2015 | Birrittella ......... H04L 45/66 370/392 |

OTHER PUBLICATIONS

USPTO May 6, 2016 Non-Final Office Action from U.S. Appl. No. 14/037,143.
USPTO Mar. 9, 2016 Non-Final Office Action from U.S. Appl. No. 14/037,210.
Boucadair et al., "Differentiated Service Function Chaining Framework," Network Working Group Internet Draft draft-boucadair-network-function-chaining-03, Aug. 21, 2013.
Quinn, et al., "Network Service Header," Network Working Group Internet Draft draft-quinn-nsh-01, Jul. 12, 2013.
"ANSI/SCTE 35 2007 Digital Program Insertion Cueing Message for Cable," Engineering Committee, Digital Video Subcommittee, American National Standard, Society of Cable Telecommunications Engineers, © Society of Cable Telecommunications Engineers, Inc. 2007 All Rights Reserved, 140 Philips Road, Exton, PA 19341; 42 pages.
"CEA-708," from Wikipedia, the free encyclopedia, Nov. 15, 2012; 16 pages http://en.wikipedia.org/w/index.php?title=CEA-708&oldid=523143431.
"Digital Program Insertion," from Wikipedia, the free encyclopedia, Jan. 2, 2012; 1 page http://en.wikipedia.org/w/index.php?title=Digital_Program_Insertion&oldid=469076482.
"Dynamic Adaptive Streaming over HTTP," from Wikipedia, the free encyclopedia, Oct. 25, 2012; 3 pages http://en.wikipedia.org/w/index.php?title=Dynamic_Adaptive_Streaming_over_HTTP&oldid=519749189.
"G-Streamer and in-band Metadata," from RidgeRun Developer Connection, Jun. 19, 2012; 5 pages https://developer.ridgerun.com/wiki/index.php/GStreamer_and_in-band_metadata.
"ISO/IEC JTC 1/SC 29, Information Technology—Dynamic Adaptive Streaming over HTTP (DASH)—Part 1: Media Presentation Description and Segment Formats," International Standard © ISO/IEC 2012—All Rights Reserved; Jan. 5, 2012; 131 pages.
"M-PEG 2 Transmission," © Dr. Gorry Fairhurst, 9 pages [Published on or about Jan. 12, 2012] http://www.erg.abdn.ac.uk/future-net/digital-video/mpeg2-trans.html.
"MPEG Transport Stream," from Wikipedia, the free encyclopedia, Nov. 11, 2012; 7 pages http://en.wikipedia.org/w/index.php?title=MPEG_transport_stream&oldid=522468296.
Wong, F., et al., "SMPTE-TT Embedded in ID3 for HTTP Live Streaming, draft-smpte-id3-http-live-streaming-00," Informational Internet Draft, Jun. 2012; 7 pages http://tools.ietf.org/html/draft-smpte-id3-http-live-streaming-00.
PCT Jan. 19, 2015 International Search Report and Written Opinion from International Application Serial No. PCT/US2014/062244.
Kumar, S., et al., "Service Function Path Optimization: draft-kumar-sfc-sfp-optimization-00.txt," Internet Engineering Task Force, IETF; Standard Working Draft, May 10, 2014.
Quinn, et al., "Network Service Header," Network Working Group Internet Draft draft-quinn-nsh-00, Jun. 13, 2013.
USPTO Oct. 23, 2015 Non-Final Office Action from U.S. Appl. No. 14/020,649.
USPTO Sep. 15, 2015 Non-Final Office Action from U.S. Appl. No. 14/037,143.
USPTO Jun. 18, 2015 Non-Final Office Action from U.S. Appl. No. 14/037,210.
USPTO Nov. 23, 2015 Final Office Action from U.S. Appl. No. 14/037,210.
USPTO Aug. 12, 2015 Non-Final Office Action from U.S. Appl. No. 14/081,772.
USPTO Nov. 24, 2015 Notice of Allowance from U.S. Appl. No. 14/081,772.
U.S. Appl. No. 15/055,691, filed Feb. 29, 2016, entitled "Shortening of Service Paths in Service Chains in a Communications Network," Inventor(s): Surendra M. Kumar, et al.

* cited by examiner

FIG. 4

LEAKING ROUTES IN A SERVICE CHAIN

TECHNICAL FIELD

This disclosure relates in general to the field of communications and, more particularly, to leaking routes in a service chain.

BACKGROUND

A computer network or data network is a telecommunications network which allows computers to exchange data. In computer networks, networked computing devices exchange data with each other along network links or data connections. Service chaining enables network operators to create what are essentially catalogs of network resources and related policies (like QoS parameters and bandwidth) to which network traffic can be applied as they move onto the network.

Service chaining involves delivering a list of services in connection with selected traffic in a specific order. A network node that selects, or classifies, the traffic is referred to as a "classifier." Services are delivered in service nodes where the actual forwarding path used to realize the service chaining is referred to as a "service path." Overlay networks provide a chassis on which to deploy services and adaptive middleware enables dynamic instantiation and configuration of distributed service components. Overlay service composition is particularly useful in distributed processing of data streams. Currently, some service paths are realized in the form of overlays, which stretch within the network infrastructure or between any of the structure and service nodes. In other words, overlays extend from the classifier to the service node and from service node to service node. The overlays are in the form of transportation encapsulation, such as UDP, GRE/NVGRE, VLXAN, SNAP, etc., carrying the original traffic to be serviced as payloads.

Flow offload is a function that occurs when a service node is not interested in the packets of the flow and requests the infrastructure to handle the flow on its behalf. Once offloaded, the infrastructure bypasses the service node for the life of the flow, thereby shortening the service path for that flow. This shortening of the service path improves the performance of its service delivery for that flow. Currently, this shortening is limited to bypassing the service node at its closest node in the infrastructure, such as the switch to which the service node is connected.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

The FIGURES of the drawings are not necessarily drawn to scale, as their dimensions can be varied considerably without departing from the scope of the present disclosure.

DETAILED DESCRIPTION OF EXAMPLE EMBODIMENTS

Overview

A method is provided in one example and includes receiving, at a network element, a flow offload decision for a first service node in a portion of a service chain for processing a flow and updating next hop flow based routing information for the flow. A next hop in the flow can insert flow specific route information in its routing tables to bypass a packet forwarder serving the service that offloaded the flow. In an example, each service chain in the flow can be defined by a service path identifier and each packet that traverses the service chain can carry the service path identifier in a network services header. In another example, each packet forwarder may be provided with next and previous hop information for the service path identifier.

In an implementation, a service path identifier routing table can be stored on the packet forwarder with flow specific routes that can be extended or re-routed. Also, information carried forward may be previous hop information for the flow and can include a flow route update. In addition, the routing information for the flow may be discarded after the flow ends or after a specific amount of time. Further, the routing information for the flow may be discarded when the capacity of the flow routing table is exhausted.

Example Embodiments

Figure 1:
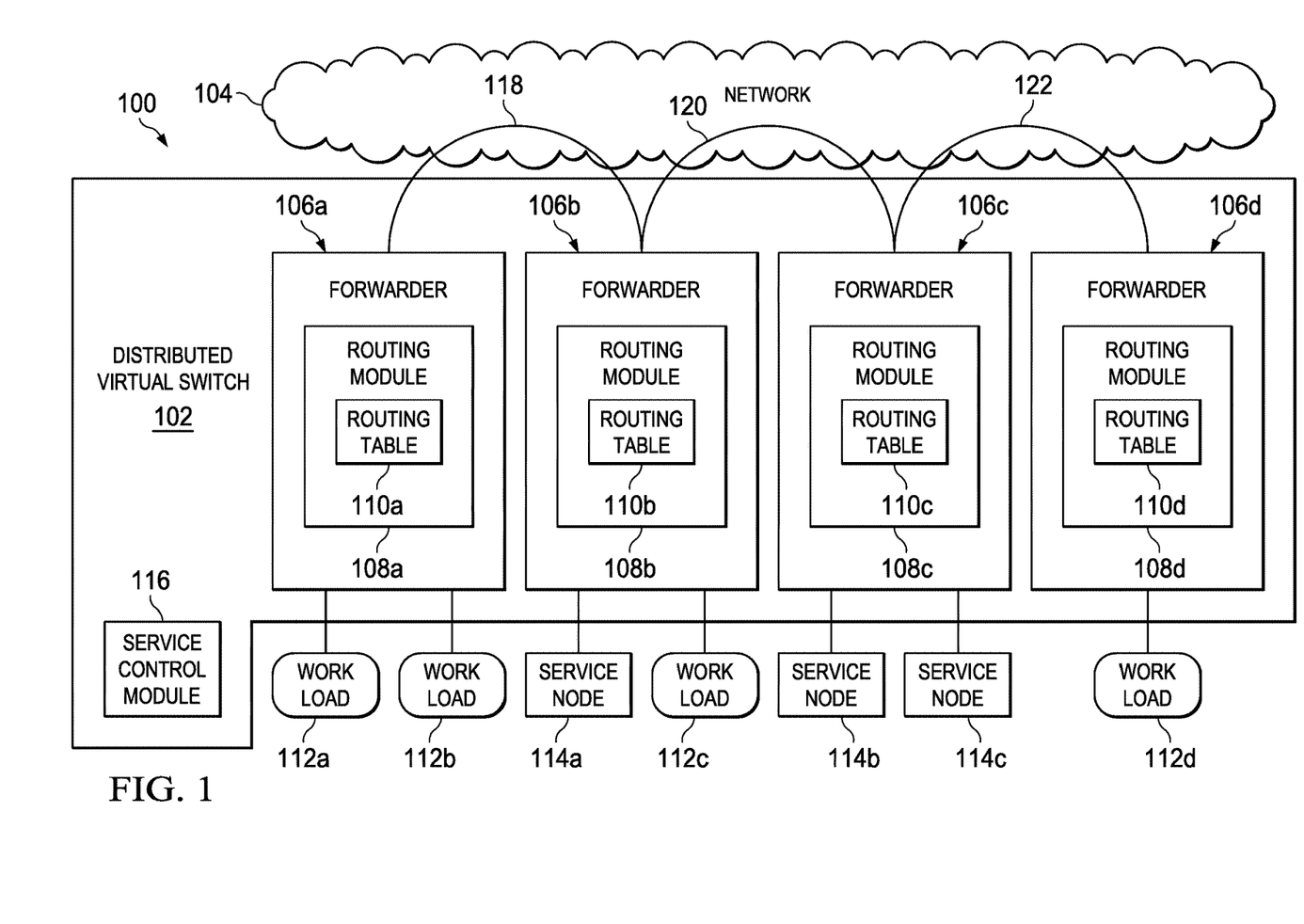
FIG. 1 is a simplified block diagram of a communication system in accordance with one embodiment of the present disclosure.

Turning to FIG. 1, FIG. 1 is a simplified block diagram of a communication system 100 for leaking routes in a service chain in accordance with one embodiment of the present disclosure. Communication system 100 can include a distributed virtual switch 102, a network 104, a plurality of workloads 112*a*-112*d*, and a plurality of service nodes 114*a*-114*d*.

Distributed virtual switch 102 can include a plurality of forwarders 106*a*-106*d* and a service control module 116. Each forwarder 106*a*-106*d* can respectively include a routing module 108*a*-108*d*. Each routing module 108*a*-108*d* can respectively include a routing table 110*a*-110*d*.

Communication system 100 can be configured to enable leaking routes in a service chain. For example, communication system 100 can be configured to leak flow routes through a service chain to optimize a flow path when service nodes (e.g., virtual service nodes) offload flows to their fast path. In a specific example, network service headers (NSH) (as described in Internet Engineering Task Force (IETF) service function chaining (SFC)) can be used to carry the optimized paths.

For purposes of illustrating certain example techniques of communication system 100, it is important to understand how typical communications may traverse the network. The following foundational information may be viewed as a basis from which the present disclosure may be properly explained.

In a typical distributed service-chaining solution, a service (e.g., DPI, firewall, IDS, virtual service hosted on a virtual machine, etc.) can be paired with a per-host and potentially virtualized packet forwarder. The role of the packet forwarder is to forward packets from packet forwarder to packet forwarder (next hop) to reach the next service and to switch packets between the packet forwarder and the service itself (e.g. by local kernel bridges, TAP interfaces, QEMU, etc.). In an example, multiple virtual service nodes may be co-located on the same host and forwarding may include sending to a next hop that is physically located on the same host. To aid in the establishment of service chains, the packet forwarders are provisioned with service chaining information to enable packets to be routed from hop to hop and service to service.

When packets are routed through a service, the packets are considered to be traveling over the slow path. This slow path is a culmination of software layers to implement a virtualization layer (if applicable) and the processing of the virtual service itself. To improve capacity, when such a service is not interested in the flow anymore, it is important to allow flows to be offloaded to the fast path, thus bypassing the slow virtual service. Typically, virtual packet forwarders can efficiently forward packets hop by hop. What is needed is a system that can be configured to enable dynamic bypass of packet forwarders that do not connect to any local service (e.g., virtual service) when flows are offloaded to the fast path.

A communication system, as outlined in FIG. 1, can resolve these issues (and others). Communication system 100 may be configured for leaking routes in a service chain and to enable dynamic bypass of packet forwarders that do not connect to any local service (e.g., virtual service) when flows are offloaded to the fast path. When packet forwarders on one or multiple hosts are part of a service chain or when packet flows are offloaded by a service to their fast path and the next previous hop of a service chain does not coincide with the host carrying the service that offloaded the flow, packets for flows are routed through hosts that do not carry any service relevant for that flow. In this particular situation, the service path for a particular flow can be short-circuited to bypass the non-relevant packet forwarder. In some instances, the next hop of the routing address can be informed of the previous hop and vice versa. In one example, a service node can be connected to a virtual routing and forwarding device where a collection of virtual routing and forwarding devices form a service chain. If the service node is not interested in the flow, route leaking can be used to bypass the virtual routing and forwarding device connected to the service node. All or a portion of the virtual routing and forwarding devices may be on the same forwarder or on distributed forwarders.

Updating the flow routes for individual flows in a flow-based service-chaining solution can help craft optimized data paths, specifically when service nodes offload flows to a fast path. By leaking individual flow routes to next and previous hops in a service chain, offloaded flows do not need to travel to packet forwarders that do not carry a service for that flow. This allows the network capacity of a service chain to be improved and no or reduced CPU cycles are spent on unnecessary forwarding of packets to nodes that are not interested in the flows to begin with.

Communication system 100 can be configured to create efficient and optimized flow-based routes through a sequence of services, including virtual services, hosted on a service chain that may be distributed over one or more physical hosts and served by a one-per-host packet forwarder when such services dynamically offload flows to the fast-path. For example, a flow's slow path is implemented by a service, whereas a fast path bypasses the service and packets are routed from packet forwarder to packet forwarder. Distributed virtual switch 102 can be configured to leak next and previous hop packet-forwarder routing information on a flow-by-flow basis between the packet forwarders, for example, using the NSH packet header to carry per-flow route information in flow-route update messages.

In an illustrated example, a service chain is hosted on hosts A, B and C, all carry a packet forwarder, and a service is hosted on B (e.g., a DPI engine). Once communication system 100 has determined the type of flow, the type of flow does not need to be reclassified again and the flow can be offloaded to the fast path. In that case, hosts A and C do not need to forward packets to hosts B to maintain the service chain. Instead, for the specific flow only, the packet forwarder on host A can forward packets directly to host C and vice versa.

In a specific example, a service chaining solution with HTTPS flows can be steered through one set of services, while other traffic is steered through another set of services on a subscriber-by-subscriber basis. The system can use NSH based service chaining and each participating virtual packet forwarder can be provisioned with the appropriate service chaining information and maintain both a next and previous hop for specific service chains. In the system, each NSH-capable service can offload a flow to the fast path using a packet forwarder.

Through NSH-based service chains, a service chain can be defined by a service-path-identifier and each packet that traverses a service chain carries in its NSH header this service path identifier. Furthermore, each packet forwarder can be provisioned with next and previous hop information for the specific service-path-identifier such that a packet can be forwarded by simply looking up the specific next/previous hop information in the packet forwarder. In an example, the service-path-identifier routing table kept on packet forwarder with flow-specific routes can be extended.

When a service node offloads a flow to its fast path, the next hop flow-based routing information for that specific flow can be carried forward (e.g., in the NSH header). The information carried forward is the previous hop information for that flow, and can be defined as a flow-route update. A next hop can inserts such flow-specific route information in its routing tables to bypass the packet forwarder serving the service that offloaded the flow in the reverse direction. This routing information only exists for route optimization and may be discarded at any time, for instance, when the flow ends, after a specific time out, or when the capacity of the flow-routing table is exhausted.

On receipt of the flow-route update message, the receiving forwarder node does not effectuate the update immediately. Delaying the update enables application of the update procedure in the reverse direction. If an update message is forwarded to a next hop with previous hop information, delaying the update allows a path to be available to enable an update in the reverse direction to ensure both forward and reverse links are updated. For example, if forwarder 106b indicates that service node 114a does not need to receive packets on path 118 from forwarder 106a, forwarder 106a can bypass forwarder 106b and send the packets directly to forwarder 106c. Packets in the reverse direction will need to go to from forwarder 106c to forwarder 106a and delaying the update allows forwarder 106b to inform forwarder 106c to send packets directly to forwarder 106a.

The flow-route-update message can be populated with previous hop information for that flow. If no specific flow information is encoded in the flow-route table, (e.g., only a service path is encoded), the flow-route update message simply carries the route information for the previous hop of that service path. If the flow-routing table already includes flow-specific route information to bypass a hop (e.g., the previous hop is already bypassed), the more specific information is included in the flow-route update message. When a packet forwarder receives a flow-route update with an optimized path for a particular flow, the packet forwarder can create a flow-specific routing entry in its flow-routing tables and note the updated next hop information in the appropriate direction.

In case flows are unidirectional, the transmission of a flow-route update-signaling message, without payload, can be communicated to the appropriate host to optimize the fast path for that flow. To support flow-route update messages, in addition to the standard NSH header parameters, the NSH carries either the IPv4 or IPv6 address of the appropriate next hop combined with header indicators or the NSH header carries a flow-route update message. The flow can be identified by the inner-packet's IP and protocol parameters. In case the offloaded service node is the first service node in a chain, the flow update may include aggregate route information specifically for that flow to bypass the first node for reverse traffic and route directly to a routed network. In case the offloaded service node is the last node in the service chain, it may, selectively, signal its next hops of the flow route through existing standards (e.g., RFC 5575).

In case a service node offloads a TCP flow to the fast path that is subject to TCP splicing, additional TCP specific parameters can be carried in the NSH header to support TCP splicing on subsequent hops. In this case, it can be sufficient to carry the TCP offsets for sequence numbers to next hops. While the examples given are with IP route optimization in mind, the same techniques apply if the service chaining solution routes by MAC addresses or some other routing means.

Communication system 100 can be configured to populate the next and previous hops in the forwarding tables using external means without requiring any provisioning of next and previous hops. Instead of requiring provisioning of next and previous hops explicitly, the next and previous hops for a particular flow can be leaked through NSH and thus built on a dynamic map of service paths. The features described herein are also transitive such that if multiple service nodes in a chain offload a flow, entire routes can be optimized. In addition, the next and previous hop entries may be maintained as real network addresses and only just the service path index and service node number may be used on a flow-by-flow basis. Further, the head- and tail-end of the service chains can announce the updated routes directly to routed networks (e.g. by signaling data-center routers). While real routers may be overwhelmed with such flow routes, concatenated virtual service chains may use this (open) mechanism to signal offloaded routes between the service chaining solutions.

Turning to the infrastructure of FIG. 1, communication system 100 in accordance with an example embodiment is shown. Generally, communication system 100 can be implemented in any type or topology of networks. Network 104 represents a series of points or nodes of interconnected communication paths for receiving and transmitting packets of information that propagate through communication system 100. Network 104 offers a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication. Network 104 can include any number of hardware or software elements coupled to (and in communication with) each other through a communications medium.

In communication system 100, network traffic, which is inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Additionally, radio signal communications over a cellular network may also be provided in communication systems 100. Suitable interfaces and infrastructure may be provided to enable communication with the cellular network.

The term "packet" as used herein, refers to a unit of data that can be routed between a source node and a destination node on a packet switched network. A packet includes a source network address and a destination network address. These network addresses can be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, and queries are forms of network traffic, and therefore, may comprise packets, frames, signals, data, etc.

In an example implementation, distributed virtual switch 102, forwarders 106a-106d, routing table 110a-110d, workloads 112a-112d, service nodes 114a-114c, and service control module 116 are meant to encompass network appliances, servers, routers, switches, gateways, bridges, load balancers, processors, modules, or any other suitable device, component, element, or object operable to exchange information in a network environment. Network elements may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

As used herein in this Specification, the term 'network element' is meant to encompass any of the aforementioned elements, as well as servers (physical or virtually implemented on physical hardware), machines (physical or virtually implemented on physical hardware), end-user devices, routers, switches, cable boxes, gateways, bridges, load-balancers, firewalls, inline service nodes, proxies, processors, modules, or any other suitable device, component, element, proprietary appliance, or object operable to exchange, receive, and transmit information in a network environment. These network elements may include any suitable hardware, software, components, modules, interfaces, or objects that facilitate the synonymous labels operations thereof. This may be inclusive of appropriate algorithms and communication protocols that allow for the effective exchange of data or information.

In one implementation, network elements implementing the leaking service chains routes in a network environment features described herein may include software to achieve (or to foster) the functions discussed herein for providing and processing when the software is executed on one or more processors to carry out the functions. This could include the implementation of instances of modules and/or any other suitable element that would foster the activities discussed herein. Additionally, each of these elements can have an internal structure (e.g., a processor, a memory element, etc.) to facilitate some of the operations described herein. In other embodiments, these functions for the concurrent deployment in a network environment may be executed externally to these elements, or included in some other network element to achieve the intended functionality. Alternatively, network elements may include software (or reciprocating software) that can coordinate with other network elements in order to achieve the concurrent deployment in a network environment functions described herein. In still other embodiments, one or several devices may include any suitable algorithms, hardware, software, components, modules, interfaces, or objects that facilitate the operations thereof.

In regards to the internal structure associated with communication system 100, distributed virtual switch 102, forwarders 106a-106d, routing tables 110a-110d, workloads 112a-112d, service nodes 114a-114c, and service control module 116 can each include memory elements for storing information to be used in the operations outlined herein. Each of distributed virtual switch 102, forwarders 106a-106d, routing tables 110a-110d, workloads 112a-112d, service nodes 114a-114c, and service control module 116 may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in communication system 100 could be provided in any database, register, queue, table, cache, control list, or other storage structure, all of which can be referenced at any suitable timeframe. Any such storage options may also be included within the broad term 'memory element' as used herein.

In certain example implementations, the leaking service chains routes functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations described herein. This includes the memory elements being able to store software, logic, code, or processor instructions that are executed to carry out the activities described herein. In some of these instances, one or more memory elements can store data used for the operations described herein. This includes the memory element being able to store instructions (e.g., software, code, etc.) that are executed to carry out the activities described in this Specification. The processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, etc.) can include memory elements for storing information to be used in achieving the concurrent deployment in a network environment functions, as outlined herein. Additionally, each of these devices may include a processor that can execute software or an algorithm to perform the leaking routes in a service chain activities as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

In an example implementation, network elements of communication system 100 may include software modules (e.g., forwarder 106a-106d, routing module 108a-108d, and service control module 116) to achieve, or to foster, operations as outlined herein. These modules may be suitably combined in any appropriate manner, which may be based on particular configuration and/or provisioning needs. In example embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, distributed virtual switch 102, forwarders 106a-106d, routing tables 110a-110d, workloads 112a-112d, service nodes 114a-114c, and service control module 116 each may include a processor that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term 'processor.'

A server can be a network element such as a physical server or virtual server and can be associated with clients, customers, endpoints, or end users wishing to initiate a communication in communication system 100 via some network (e.g., network 104). The term 'server' is inclusive of devices used to serve the requests of clients and/or perform some computational task on behalf of clients within communication systems 100.

As an illustrated example, a service chain or flow is hosted on forwarders 106a-106d and all can include a packet forwarder, for example routing module 180a-108d respectively. Routing tables 110a-110d can includes next and previous hop information for the service flow. Path 118 can go between forwarder 106a and forwarder 106b (i.e., forwarder 106a and forwarder 106b can exchange data using path 118). Path 120 can go between forwarder 106b and forwarder 106c (i.e., forwarder 106b and forwarder 106c can exchange data using path 120). Path 122 can go between forwarder 106c and forwarder 106d (i.e., forwarder 106c and forwarder 106d can exchange data using path 122). Service control module 116 can be configured to determine the type of flow and that flow can be offloaded to the fast path.

Figure 2:
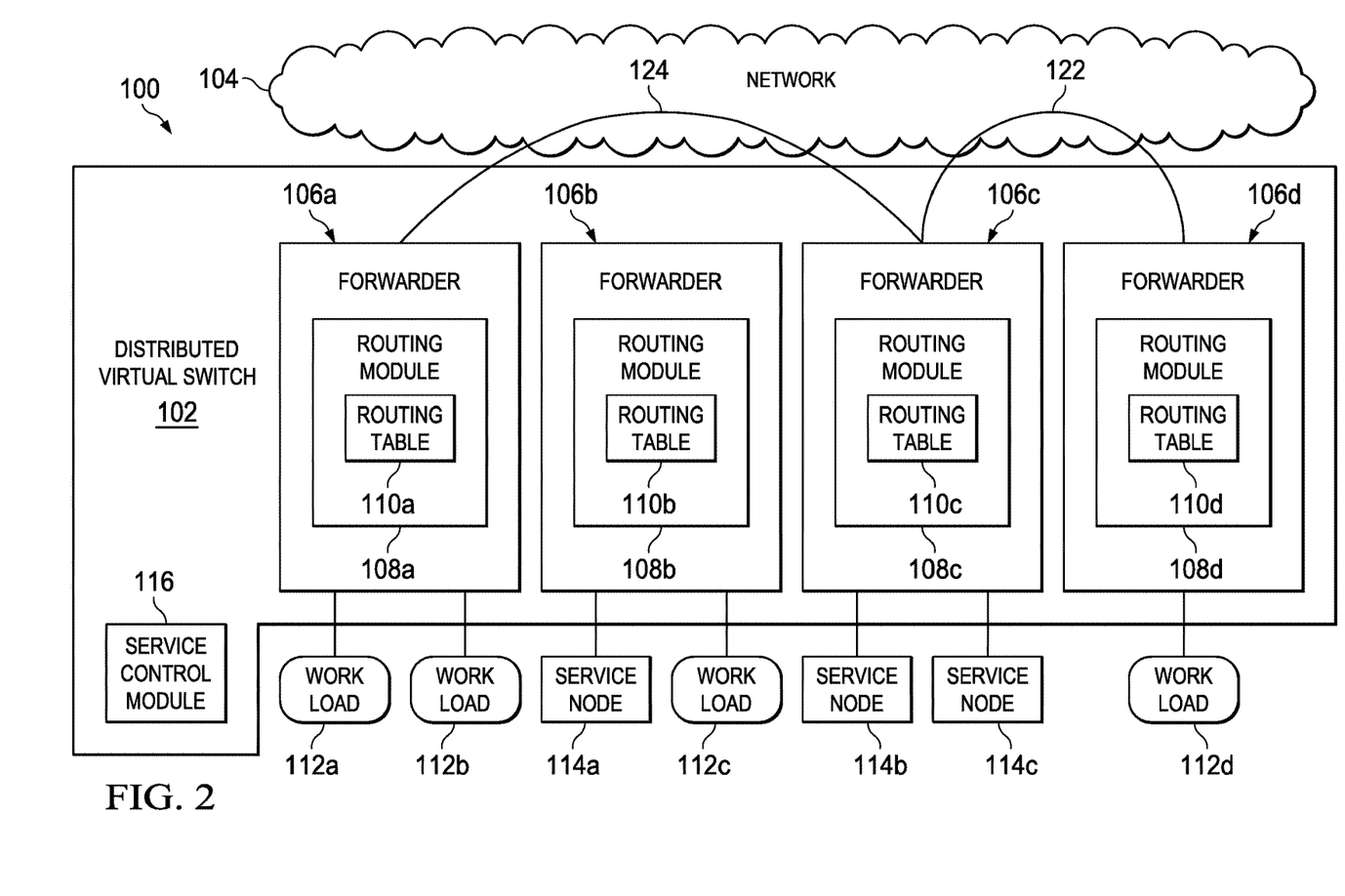
FIG. 2 is simplified block diagram of a portion of a communication system in accordance with one embodiment of the present disclosure.

Turning to FIG. 2, FIG. 2 is a simplified block diagram of a communication system 100 for leaking routes in a service chain in accordance with one embodiment of the present disclosure. In an example, service control module 116 has determined that forwarder 106a does not need to forward packets to forwarder 106b on path 118 to maintain the service chain. For example, service node 114a may not be needed for packets on path 118. Routing table 110a in routing module 108a of forwarder 106a can be updated so forwarder 106a bypasses forwarder 106b and communicates directly with forwarder 106c using path 124. In addition, routing table 110c in routing module 108c of forwarder 106c can be updated so forwarder 106c bypasses forwarder 106b and communicates directly with forwarder 106a using path 124.

Figure 3:
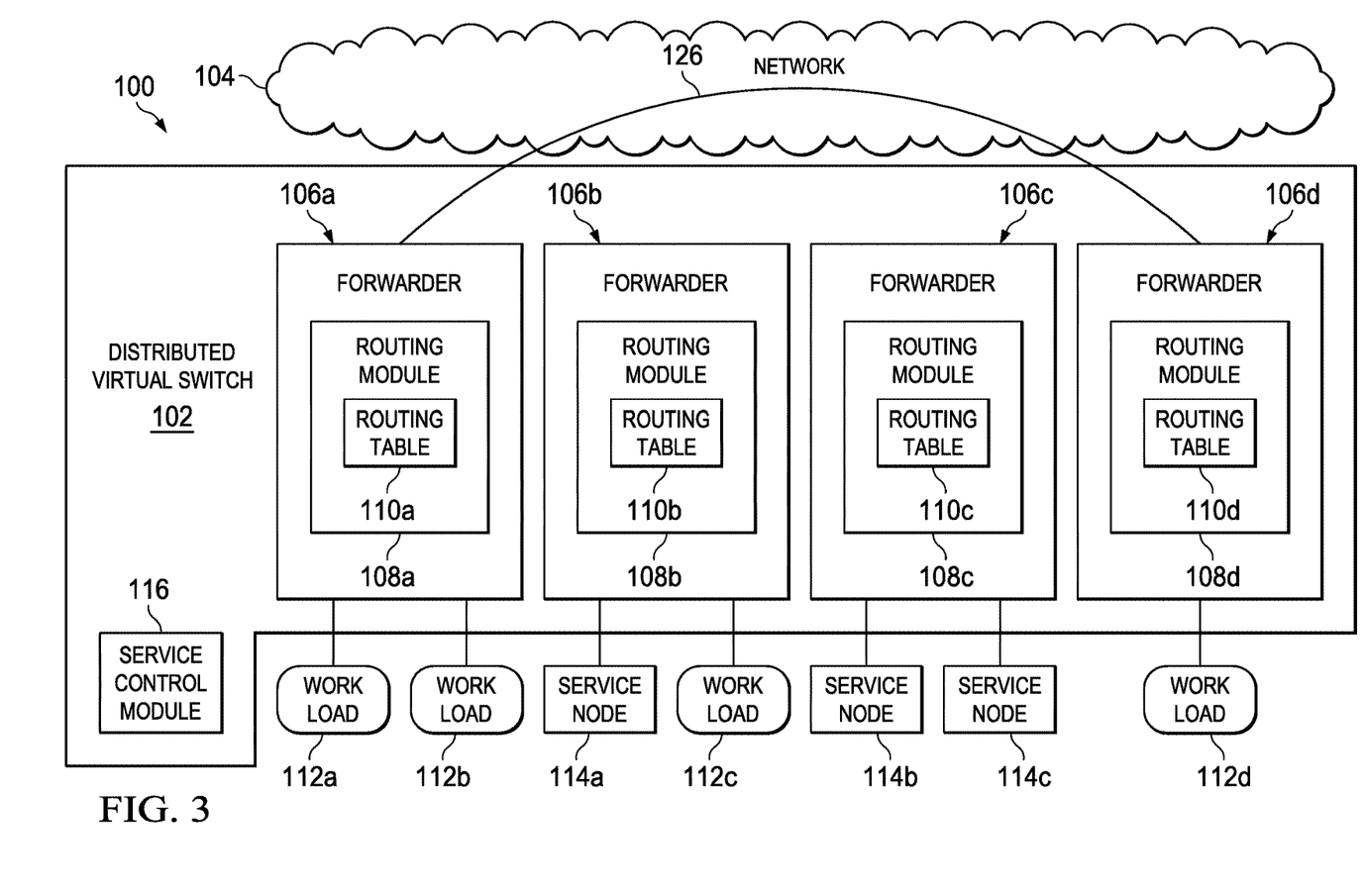
FIG. 3 is simplified block diagram of a portion of a communication system in accordance with one embodiment of the present disclosure.

Turning to FIG. 3, FIG. 3 is a simplified block diagram of a communication system 100 for leaking routes in a service chain in accordance with one embodiment of the present disclosure. In an example, service control module 116 has determined that forwarder 106a does not need to forward packets to forwarder 106b on path 118 to maintain the service chain or to forwarder 106c on path 124. For example, service node 114b and service node 114c may not be needed for packets on path 124. Routing table 110a in routing module 108a of forwarder 106a can be updated so forwarder 106a bypasses forwarder 106b and forwarder 106c and communicates directly with forwarder 106d using path 126. In addition, routing table 110d in routing module 108d of forwarder 106d can be updated so forwarder 106d bypasses forwarder 106c and communicates directly with forwarder 106a using path 126.

Figure 4:
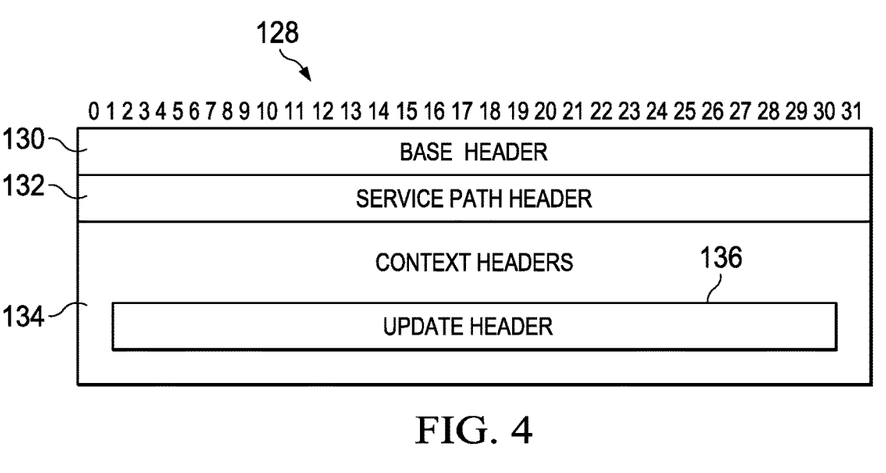
FIG. 4 is simplified block diagram of a portion of a communication system in accordance with one embodiment of the present disclosure.

Turning to FIG. 4, FIG. 4 is a simplified block diagram of a packet 128 for use in communication system 100 for leaking routes in a service chain in accordance with one embodiment of the present disclosure. In an example, packet 128 can include a base header 130, a service path header 132, and context headers 134. Context headers 134 can include update header 136. Update header 136 can be used to update routing tables 110a-110d in both the forward and reverse directions.

Note that in certain example implementations, the concurrent deployment in a network environment functions outlined herein may be implemented in logic encoded in one or more non-transitory media (e.g., embedded logic provided in an application specific integrated circuit [ASIC], digital signal processor [DSP] instructions, software [potentially inclusive of object code and source code] to be executed by a processor, or other similar machine, etc.). In some of these instances, a memory element can store data used for the operations described herein. This includes the memory element being able to store code (e.g., software, logic, processor instructions, etc.) that can be executed to carry out the activities described in this Specification. A processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Note that with the examples provided herein, interaction may be described in terms of two, three, or more network elements. However, this has been done for purposes of clarity and example only. In certain cases, it may be easier to describe one or more of the functionalities of a given set of flows by only referencing a limited number of network elements. It should be appreciated that communication system 100 and their teachings are readily scalable and can accommodate a large number of components, as well as more complicated/sophisticated arrangements and configurations. Accordingly, the examples provided should not limit the scope or inhibit the broad teachings of communication system 100 as potentially applied to a myriad of other architectures.

It is also important to note that the operations illustrate only some of the possible correlating scenarios and patterns that may be executed by, or within, communication system 100. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 100 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although communication system 100 has been illustrated with reference to particular elements and operations that facilitate the communication process, these elements and operations may be replaced by any suitable architecture, protocols, and/or processes that achieve the intended functionality of communication system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
receiving, at a network element, a flow offload decision for a first service node in a portion of a service chain for processing a flow; and
updating next hop flow based routing information for the flow, wherein a next hop in the flow can insert flow specific route information in its routing tables to bypass a packet forwarder serving a service that offloaded the flow.

2. The method of claim 1, wherein each packet forwarder in the flow can be defined by a service path identifier and each packet that traverses the service chain carries the service path identifier in a network services header.

3. The method of claim 2, wherein each packet forwarder is provided with next and previous hop information for the service path identifier.

4. The method of claim 1, wherein a service path identifier routing table is stored on the packet forwarder with flow specific routes that can be extended.

5. The method of claim 1, wherein information carried forward is previous hop information for the flow and can include a flow route update.

6. The method of claim 1, wherein the next hop flow based routing information for the flow is discarded after the flow ends or after a specific amount of time.

7. The method of claim 1, further comprising:
delaying the update of a routing table in a previous hop in a reverse direction of the flow.

8. Logic encoded in one or more non-transitory tangible media that includes code for execution and when executed by a processor, operable to perform operations comprising:
receiving, at a network element, a flow offload decision for a first service node in a portion of a service chain for processing a flow; and
updating next hop flow based routing information for the flow, wherein a next hop can insert flow specific route information in its routing tables to bypass a packet forwarder serving the service that offloaded the flow.

9. The logic of claim 8, wherein each packet forwarder in the flow can be defined by a service path identifier and each packet that traverses the service chain carries the service path identifier in a network services header.

10. The logic of claim 9, wherein each packet forwarder is provided with next and previous hop information for the service path identifier.

11. The logic of claim 8, wherein a service path identifier routing table is stored on the packet forwarder with flow specific routes that can be extended.

12. The logic of claim 8, wherein information carried forward is previous hop information for the flow and can include a flow route update.

13. The logic of claim 8, wherein the next hop flow based routing information for the flow is discarded after the flow ends, after a specific amount of time, or when the capacity of the flow routing table is exhausted.

14. An apparatus, comprising:
a memory element configured to store data,
a processor operable to execute instructions associated with the data, and
a routing module configured to:
receive a flow offload decision for a first service node in a portion of a service chain for processing a flow, wherein the service chain is identified by a service path identifier; and
update next hop flow based routing information for the flow, wherein a next hop in the flow can insert flow specific route information in its routing tables to bypass a packet forwarder serving a service that offloaded the flow in a reverse direction.

15. The apparatus of claim 14, wherein each packet forwarder in the flow can be defined by a unique service path identifier and each packet that traverses the service chain carries the unique service path identifier in a network services header.

16. The apparatus of claim 15, wherein the routing module is provided with next and previous hop information for the unique service path identifier.

17. The apparatus of claim 14, wherein the routing module includes a routing table and the routing table with flow specific routes can be extended.

18. The apparatus of claim 17, wherein information carried forward is previous hop information for that flow and can include a flow route update.

19. The apparatus of claim 14, wherein the next hop flow based routing information for the flow is discarded after the flow ends, after a specific amount of time, or when a flow routing table capacity is exhausted.

20. The apparatus of claim 14, wherein the next hop flow based routing information for the flow is discarded after a predetermined amount of time or when a routing table capacity is exhausted.

* * * * *

UNITED STATES PATENT AND TRADEMARK OFFICE
CERTIFICATE OF CORRECTION

PATENT NO. : 10,063,468 B2
APPLICATION NO. : 14/997212
DATED : August 28, 2018
INVENTOR(S) : Hendrikus G. P. Bosch et al.

It is certified that error appears in the above-identified patent and that said Letters Patent is hereby corrected as shown below:

In the Specification

In Column 1, Line 36, delete "VLXAN," and insert -- VXLAN, --, therefor.

In the Claims

In Column 11, Line 50, in Claim 8, delete "serving the" and insert -- serving a --, therefor.

Signed and Sealed this
Twenty-fifth Day of December, 2018

Andrei Iancu
*Director of the United States Patent and Trademark Office*